United States Patent

Ebeling, deceased

[15] 3,686,435

[45] Aug. 22, 1972

[54] APPARENT ALTITUDE CHANGES IN TELEVISION MODEL VISUAL SYSTEM

[72] Inventor: William C. Ebeling, deceased, late of Wilton, Conn. by Dorothy Stott Ebeling, executrix

[73] Assignee: The Singer Company, New York, N.Y.

[22] Filed: Dec. 4, 1970

[21] Appl. No.: 95,112

[52] U.S. Cl. ............................178/6.8, 178/DIG. 35

[51] Int. Cl. ............................................H04n 7/18

[58] Field of Search ........................178/DIG. 35, 6.8

[56] References Cited

UNITED STATES PATENTS

| | | | |
|---|---|---|---|
| 3,261,912 | 7/1966 | Hemstreet | 178/DIG. 35 |
| 3,497,614 | 2/1970 | Petrocelli et al. | 178/DIG. 35 |
| 3,327,407 | 6/1967 | Barnes | 178/DIG. 35 |
| 3,247,317 | 4/1966 | Saylor | 178/DIG. 35 |
| 3,420,953 | 1/1969 | Wolff | 178/DIG. 35 |

*Primary Examiner*—Robert L. Griffin
*Assistant Examiner*—Richard K. Eckert, Jr.
*Attorney*—Francis L. Masselle, William Grobman and Charles S. McGuire

[57] ABSTRACT

Apparatus to change the apparent altitude of the probe in a camera model visual system and thus avoid depth of field problems at low altitudes. By stretching the vertical raster on camera tube in proportion to the ratio of actual and desired probe altitude while maintaining a normal display raster, an apparent altitude change appears on the displayed scene.

12 Claims, 22 Drawing Figures

Figure 1A:
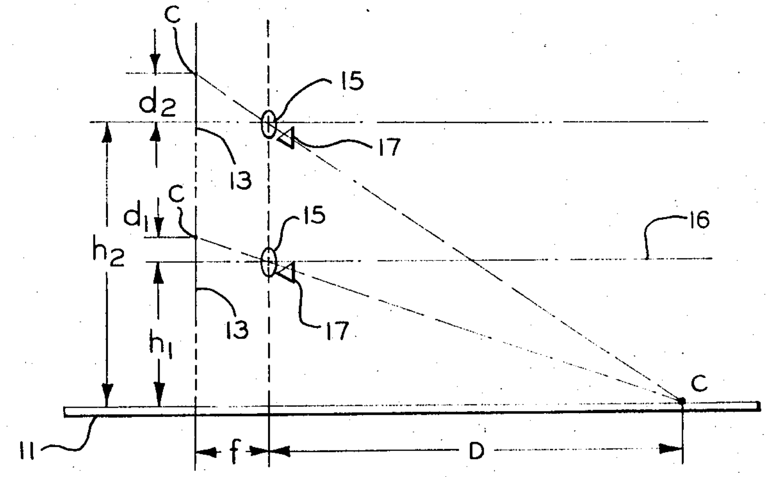

William C. Ebeling, deceased
INVENTOR
by Dorothy S. Ebeling, Executrix
BY
Charles S. McGuire
ATTORNEY Camera Display

*William C. Ebeling, deceased*
INVENTOR.
*by Dorothy S. Ebeling, Executrix*
BY
*Charles S. McGuire*
ATTORNEY Camera Display William C. Ebeling, deceased
INVENTOR.
by Dorothy S. Ebeling, Executrix
BY
Charles S. McGuire,
ATTORNEY William C. Ebeling, deceased
INVENTOR.
by Dorothy S. Ebeling, Executrix
BY
Charles S. McGuire
ATTORNEY William C. Ebeling, deceased
INVENTOR.
by Dorothy S. Ebeling, Executrix
BY
Charles S. McGuire
ATTORNEY

APPARENT ALTITUDE CHANGES IN TELEVISION MODEL VISUAL SYSTEM

This invention relates to camera model visual systems wherein an optical probe is moved relative to a terrain model; more particularly, the invention relates to an improvement in such a system to obtain better depth of focus at low altitudes.

Camera model systems are commonly used to provide to a trainee in an aircraft trainer, or the like, a scene simulating the real world. Generally this is done by constructing a scale model of an area of terrain and then "flying" over this model with an optical probe movable in up to six degrees of freedom in accordance with simulated movement of the trainer. The image viewed by the probe is transmitted optically to a television camera tube and then electronically to a television display viewed by the trainee. One of the main disadvantages of such a system is that because of the nature of the optics in the probe, it has a narrow depth of field. Thus, when the probe is close to the model, simulating low-altitude flight, it is difficult to provide a realistic picture since only a small portion of the total image viewed can be in focus. At higher altitudes, all of the scene is relatively distant and this problem does not exist. In addition, as the probe is brought close to the model, intricate sensing apparatus is required to avoid a collision. The present invention solves these problems by providing a system wherein the probe never goes below a predetermined altitude, further altitude decrease being simulated instead by expanding the television raster on the television camera tube.

It is the principal object of this invention to provide a camera model system with an optical probe having good depth of field at all altitudes.

Another object is to provide apparatus for changing the apparent altitude of the probe in a camera model system without moving the probe.

A further object is to provide an improved camera model visual simulation system.

Other objects will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

Figure 3A:
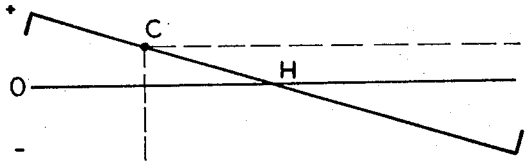
Figure 3C:
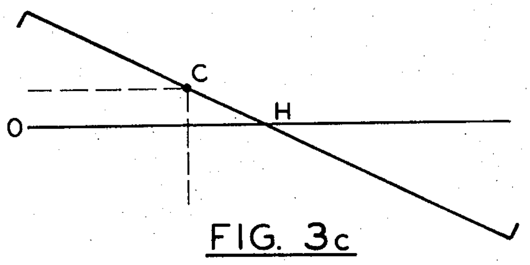
Figure 3B:
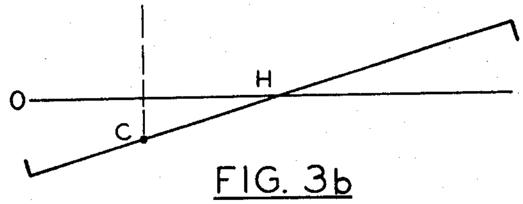
Figure 3D:
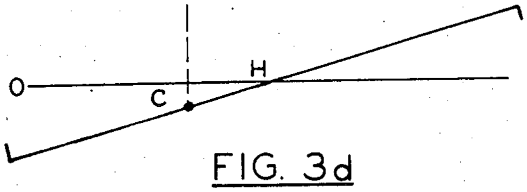
Figure 3E:
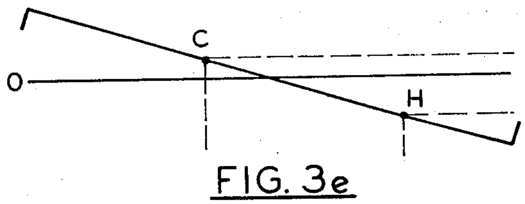
Figure 3I:
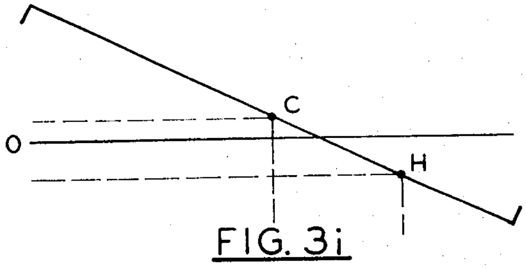
Figure 3G:
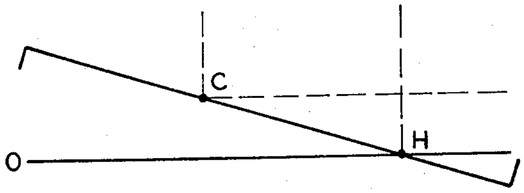
Figure 3H:
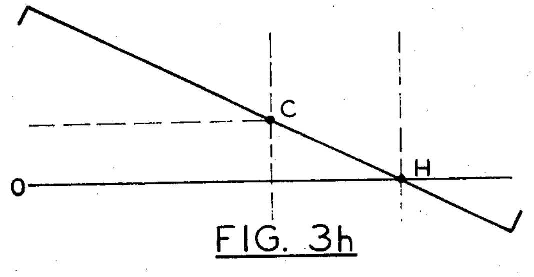
Figure 3J:
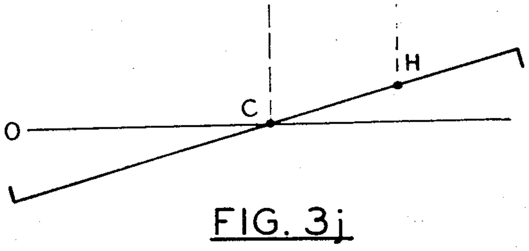
Figure 4:
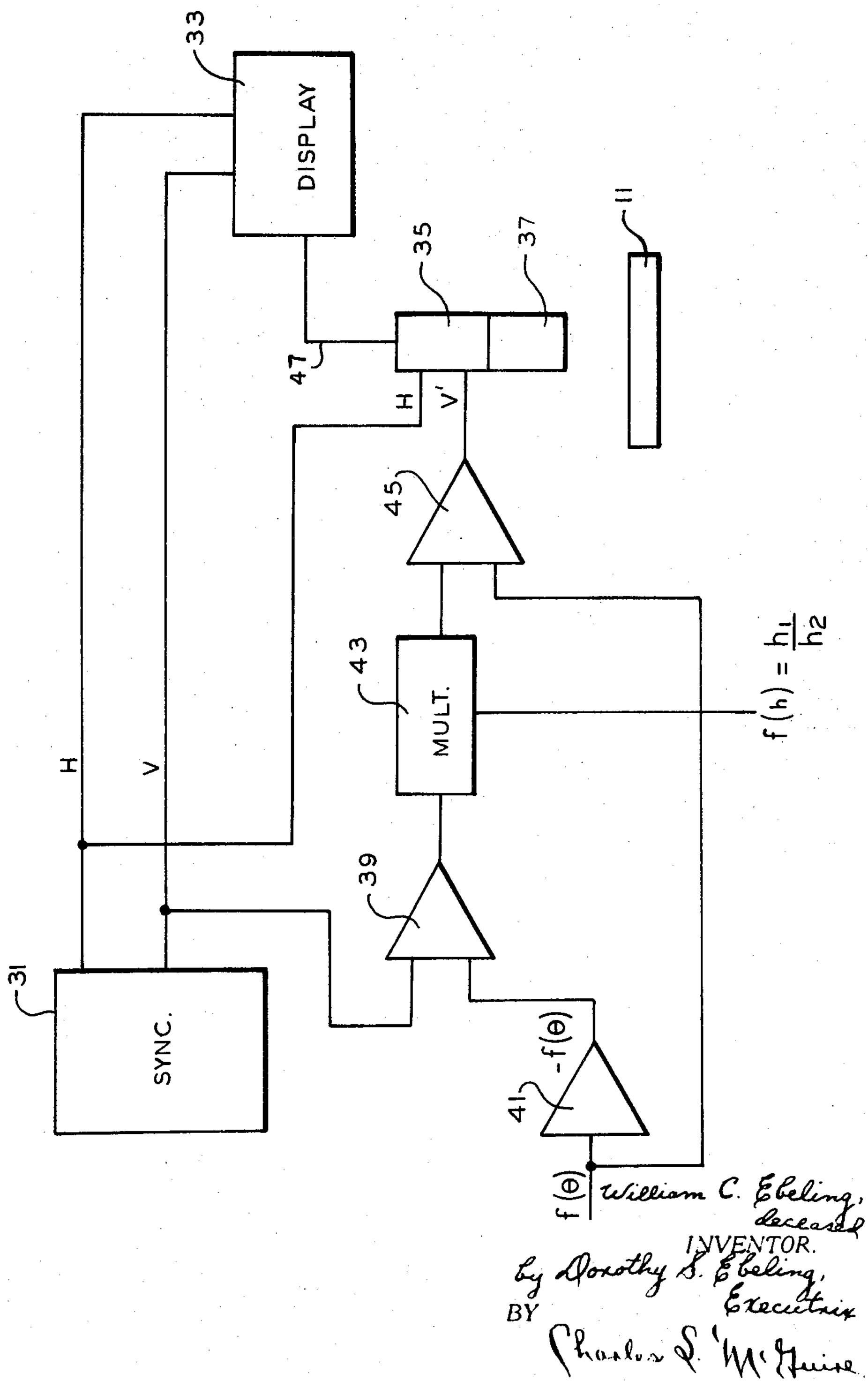

For a fuller understanding of the nature and objects of the invention reference should be had to the following detailed description taken in connection with the accompanying drawings, in which:

FIGS. 1*a* and *b* are diagrams of the geometric relations between the terrain model and camera tube;

FIGS. 2*a* – 2*j* illustrate the necessary camera tube and display rasters required in the invention;

FIGS. 3 *a* – 3*e* and 3*g* – 3*j* shows the waveforms associated with the respective raster shapes of FIG. 2; and FIG. 4 is a schematic diagram of a preferred embodiment of the total display system associated with the invention.

Camera model visual systems of the type with which the present invention is concerned have been employed in the past to provide a realistic visual display in connection with pilot training in aircraft simulators. Many suitable systems have been previously used in such systems for supporting and moving the optical probe of a TV camera relative to a terrain model, as well as for displaying the resulting scene in a realistic format. The present disclosure will therefore be limited to a description of only those details of such systems with which the invention is directly concerned, it being assumed that conventional apparatus is provided for moving the camera probe in response to simulated movement of the training simulator, and other conventional functions.

FIG. 1*a* shows diagrammatically the vertical position at which an arbitrary point C on terrain model 11 will appear on TV camera tube 13 with lens 15 at two different altitudes, h1 and h2, above the model. Point C will appear on the tube at distances *d*1 and *d*2 above horizontal axis 16 with lens 15 at altitudes *h*1 and *h*2, respectively, although the point is the same horizontal distance D from the lens in each case. Suitable means (not shown) are provided for translating and rotating the TV pickup in five degrees of freedom with movement in the sixth degree, i.e., with rotation about the pitch axis, being provided by movement of pitch prism 17 in conventional fashion. It is assumed for purposes of the present discussion that pickup and display optics and other physical relationships are such that for zero degrees of pitch the horizon will appear halfway between the top and bottom of the display, as shown more fully later herein.

Figure 1B:
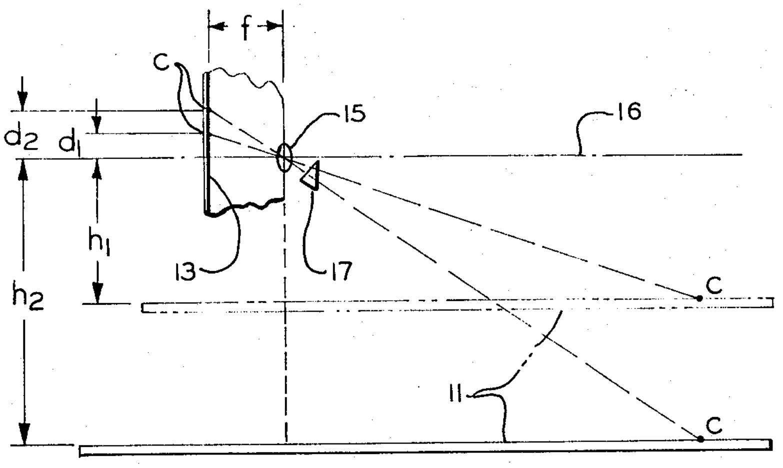

It may be clearly seen that the distance *d* decreases as altitude *h* decreases, i.e., point C appears closer to horizontal axis 16 at lower altitudes. It is further assumed that altitude *h*2 is the desired minimum altitude of lens 15, for the reasons previously discussed. FIG. 1*b* illustrates in principle the effect of the present invention. That is, although lens 15 remains at altitude *h*2, the position of point C is shifted on camera tube 13 from distance *d*2 to distance *d*1 above horizontal axis 16, thereby effecting an apparent change in altitude of lens 15 from h2 to h1 above model 11. This is done, of course, without change in pitch attitude since the latter, while changing the position of point C on the tube, also changes the position of the horizon and does not effect the relative positional difference which accompanies altitude changes.

FIGS. 2 *a* through 2 *j* show how, by stretching the raster, a displacement of the type accompanying altitude changes may be accomplished. FIG. 2 *a* shows the point C imaged on the normal raster 21 of the camera tube 13, halfway between horizon 19 and the top of the image. This is equivalent to distance *d*2 in FIG. 1. When this is displayed the display raster will be inverted and point C will appear as shown on FIG. 2*b*, below rather than above the horizon, and thus halfway between horizon 19 and the bottom of the image. This corresponds to altitude *h*2 of FIG. 1 and, as previously mentioned, is assumed to be the minimum desired probe altitude.

FIG. 3*a* shows the vertical waveform corresponding to the scan through point C. The horizontal axis represents time and the vertical axis the vertical position of the cameral tube and the corresponding magnitude of the signal applied to the vertical deflection circuits. The letter H indicates that the scan passes the horizon line halfway between the beginning and end of the time scale and also halfway between the highest and lowest deflection voltages, i.e., at the vertical deflection zero point. As indicated by FIG. 3*b*, the polarity of the scan signal, and thus vertical position, is merely reversed in going from the camera raster to the display raster. The time scale and signal magnitudes are the same, whereby point C appears in the same relation to the horizon and the raster area, except that on the display it is below rather than above the horizon.

Figure 2A:
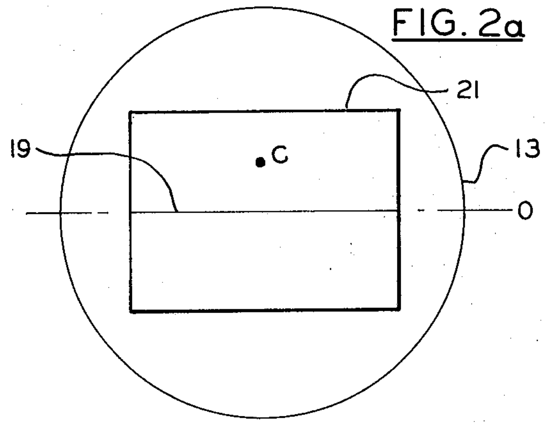
Figure 2B:
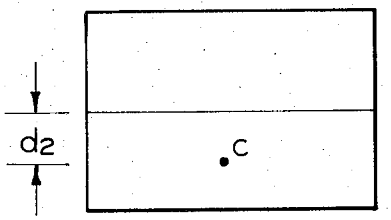
Figure 2C:
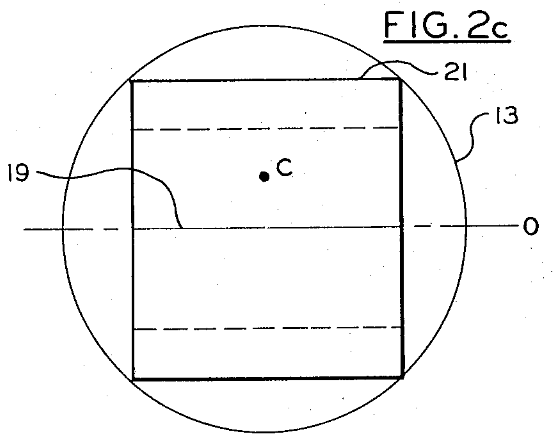
Figure 2D:
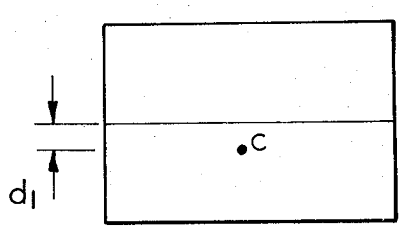

FIGS. 2*c* and 2*d*, together with corresponding FIGS. 3*c* and 3*d*, illustrate how the apparent altitude change is effected electronically, i.e., without moving the probe. The camera raster 21 which was formerly within the area indicated by the dotted lines in FIG. 2*c* is expanded equal distances above and below the horizon line 19. This is accomplished by increasing the deflection signal in both the positive and negative directions within the same time scale as the original scan. This is illustrated by a comparison of FIGS. 3*a* and 3*c*. Although point C is still the same vertical distance above the horizon it is now only one third of the way from the horizon to the top of the raster, rather than halfway. The vertical scan signal for the display raster (3*d*), in addition to being reversed in polarity as before, is kept at the original magnitude. Again, the same time scale is maintained and, as seen from a comparison of FIGS. 3*c* and 3*d*, point C will appear on the display scan one third of the way between the bottom of the raster (which is the same size as the original) and the horizon. As indicated in FIG. 2*d*, point C appears on the display a distance d1 below the horizon, as it would appear if the probe were positioned at altitude h1 above the model. Thus, an apparent change in altitude has been effected by stretching the camera raster vertically from the original or reference size and keeping the size of the display raster at the original while maintaining the vertical relationships of the stretched raster.

Figure 2E:
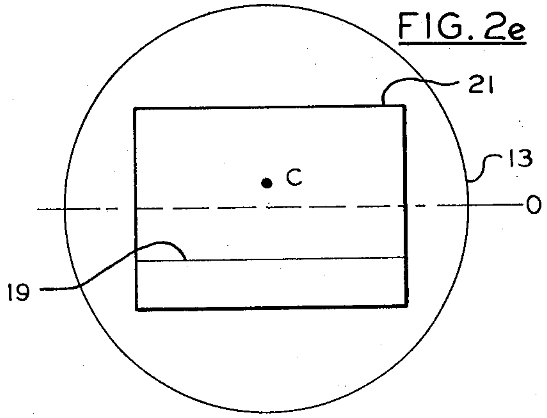
Figure 2F:
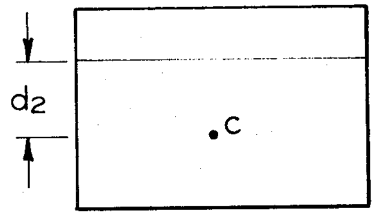
Figure 2G:
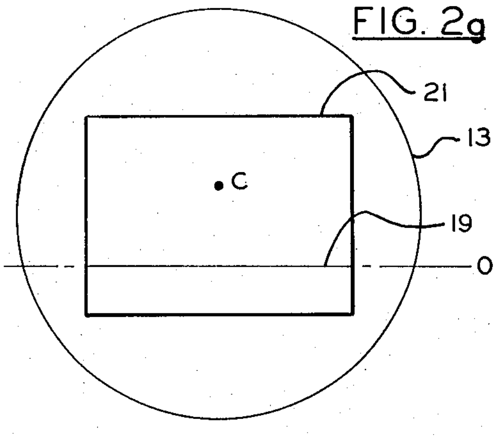

The foregoing example assumes, of course, 0° of pitch, i.e., the horizon is at the center of the display. FIGS. 2*e* and 2*f* show the camera and display rasters, respectively, with the probe at altitude h2 and pitch wedge 17 (FIG. 1) rotated to cause the view of the probe to be pitched down. Thus, the horizon line 19 appears below the center of the camera raster and a corresponding distance above the center of the display raster. Point C, is assumed to be in the same relative position to the horizon and boundary of the rasters, i.e., halfway between. (Distance *d*2 is larger in FIG. 2*f* than in FIG. 2*b* since in both cases it represents half the distance from the horizon to the bottom of the display.) FIG. 3*e* shows the normal vertical camera scan corresponding to the raster shown in FIG. 2*e*; the scan would merely be reversed in polarity, at the same magnitude and time scale, to produce the display raster of FIG. 2*f*.

Figure 2H:
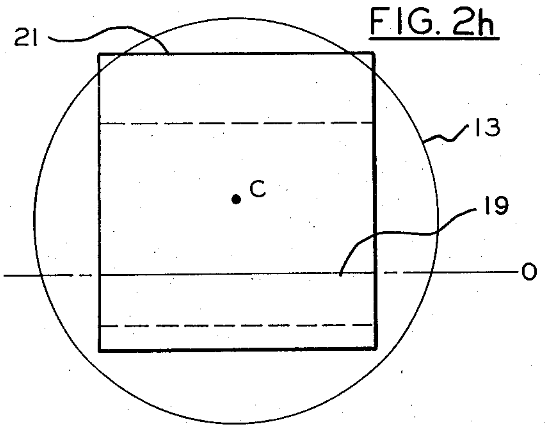
Figure 2I:
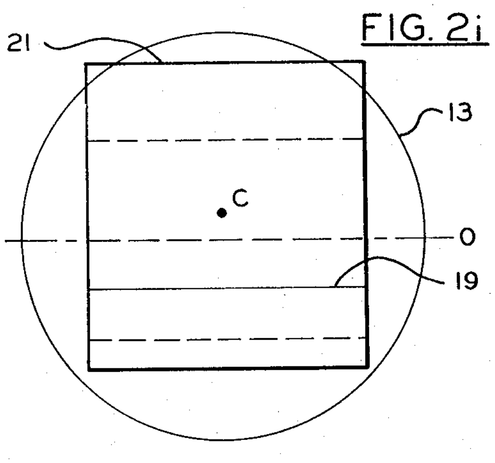

In order to effect an apparent altitude change with the probe at other than zero degrees of pitch the scan is shifted to place the horizon at the zero signal level, as shown in FIG. 3*g*, by increasing the initial positive voltage and decreasing the terminal negative voltage while maintaining the same time scale and absolute value of signal difference from beginning to end of the scan. The camera raster is then stretched by increasing the absolute value of signal difference within the same time scale, which has the effect of increasing the slope of the scan from that shown in FIG. 3*g* to that shown in FIG. 3*h*. The camera raster is stretched above and below the horizon in proportion to the signal magnitude above and below the zero point. That is, the raster is stretched a greater amount above its original upper boundary than it is below its original lower boundary, as seen in FIG. 2*h*, since the signal magnitude is proportionately larger on the positive side of the zero signal level.

After the raster has been stretched with the zero signal level at the horizon line, which is below the center of the camera raster with the new pitch attitude, the scan is again shifted to place the zero signal level back to the center of the original raster. This is below the center of the stretched raster, as illustrated in FIG. 3*i* with respect to the signal trace and in FIG. 2*i* with respect to the relationships on camera raster 21, since the stretching was greater at the top, as previously noted. The camera rasters of FIGS. 2*g* and 2*h* never actually appear on the tube and are shown only to illustrate more clearly the equivalent raster appearance for the electronic operations which take place.

Figure 2J:
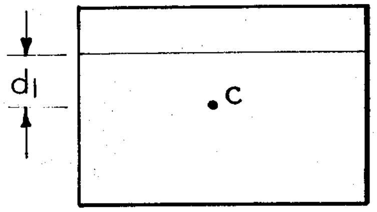

The display raster is as shown in FIG. 3*j*, the polarity of the camera signal of FIG. 3*i* being reserved and the magnitude as in the original, unstretched condition of FIG. 3*e* within the same time reference. The effect is to shift point C into coincidence with the vertical zero, at the center of the scan. Thus, point C appears on the display halfway between the top and bottom and one third of the distance from the horizon line to the bottom, as shown in FIG. 2*j*. This corresponds to distance d1 between point C and the horizon, as the appearance would be from altitude *h*1. It is again noted that distance *d*1 varies with pitch attitude and therefore is not the same dimension in the display of FIG. 2*j* as in that of FIG. 2*d*, although it does represent the same relationship and the apparent altitude change is the same.

FIG. 4 is a schematic block diagram of a preferred embodiment of the invention including suitable electronic means for providing the above described raster shapes and waveforms. The sync generator 31 provides horizontal and vertical scans to display 33. The same horizontal scan goes to camera 35 on which is mounted probe 37 looking at model 11. The vertical scan, corresponding to the traces of FIG. 3*a* and *e*, is fed to an amplifier 39 where it is summed with the negative of a function of the pitch angle (o) obtained from inverting amplifier 41 having the function of pitch angle as an input. This function will be a DC voltage and will cause an offset as shown in the trace of FIG. 3*g*. The output of amplifier 39 is then multiplied in multiplier 43, a standard high frequency multiplier, by the function of $h1/h2$ as shown in FIG. 1, i.e., the ratio of the desired apparent altitude to the actual altitude. The output of the multiplier 43, corresponding to the trace of FIG. 3*h* is then summed in amplifier 45 with the positive function of pitch to reshift the trace, resulting in a trace corresponding to FIG. 3*i*. The output of amplifier 45 is the input to the vertical deflection of camera 35, and will result in a raster corresponding to FIG. 2*i*. If o is zero no offset will occur and the traces will be as shown on FIG. 3*a* – 3*d*.

The video signal is transmitted from camera 35 over line 47 to display 33. If the camera vertical scan is as shown on FIG. 3i and the display scan as shown on 3*j*, then at the time point C is intersected by the scan of FIG. 3*i* and the video corresponding to that point is transmitted to the display, scan 3*j* will be at zero and C will appear at that point on the display as shown on FIG. 2*j*.

The disclosure herein has been limited to the stretching and shrinking of the raster in the vertical direction. However, where roll attitude is changed prior to imaging on the camera, it can be seen that to be completely accurate stretching or shrinking in the vertical direction along will not be sufficient. For example, if the aircraft is rolled 90°, the horizon will be vertical on the tube and stretching and shrinking of the raster in the horizontal direction will be necessary. At points between 0° and 90° of roll a combination is required to properly provide the apparent altitude change. Obviously, the method by which the vertical scan is changed to stretch or shrink the raster in the vertical direction may also be applied to the horizontal scan to stretch and shrink the raster in the horizontal direction. If the stretching and shrinking is done in both axes the altitude and pitch functions may be resolved into two components before they are used to shift and multiply the scans. For example, the altitude function $h1/h2$ would be first multiplied by the cosine of roll to obtain the input to multiplier 43 for use with the vertical scan and would be multiplied by the sine of roll to obtain the multiplier input for use with the horizontal scan. However, since in many applications the aircraft will not normally be rolled to any great degree at low altitudes, it may be sufficient to neglect the horizontal component and only stretch and shrink in the vertical direction.

It should be noted that in reaching the above result any objects in the field of view which have vertical relief will appear to shrink when displayed.

However, since the only time an aircraft will normally go below the minimum probe altitude is when landing or taking off, and the scene normally viewed under these circumstances will be a runway and surrounding terrain which is in most cases flat and which contains few vertical objects, this drawback should not greatly impair the usefulness of the system.

Thus, it can be seen that by stretching the camera raster simulated changes in altitude may be accomplished without moving the probe, thereby allowing a good depth of focus to be maintained. Although compensation for pitch only has been shown, the same methods may be used to compensate for errors due to any of the three rotational degrees of freedom of the probe. Other methods of additional and multiplication may be used and shrinking to effect apparent altitude increase, rather than stretching may also be useful in some applications.

What is claimed is:

1. In a camera model visual system comprising a television camera mounted on a movable probe viewing a model and imaging a view of the model on the tube of the camera and a television display displaying the video signal generated by the camera, the horizontal and vertical scan signals of both camera and display being generated by a common sync generator, a method of providing improved depth of focus at simulated low altitudes comprising the steps of:

a. limiting the minimum probe altitude to an altitude at which adequate depth of focus is maintained; and b. accomplishing further altitude decrease by stretching the raster traced on the camera tube by multiplying one or more of the scan signals supplied to the camera by the ratio of the apparent altitude to be simulated to the said minimum probe altitude while making no change to the scan signals supplied to the display.

2. The invention according to claim 1 and further including the step of first shifting the vertical zero of the raster on said tube to coincide with the apparent horizon of the image on said tube.

3. The invention according to claim 2 wherein said shifting is accomplished by adding a DC offset voltage to said vertical scan signal.

4. The invention according to claim 3 wherein the value of said offset voltage is a function of the pitch attitude at which the scene is viewed by said probe.

5. The invention according to claim 4 and further including the step of reshifting the vertical zero of said camera raster to its original position with respect to said apparent horizon after stretching or shrinking.

6. The invention according to claim 5 wherein said reshifting is accomplished by adding to said vertical scan a DC offset voltage of equal magnitude and opposite sign to that added when said raster was first shifted.

7. In a camera model visual system, having a pickup comprising a television camera with a movable probe, and wherein the video from said camera is displayed on a television display apparatus to improve depth of focus at simulated low altitudes comprising:

a. means to limit the minimum probe altitude to an altitude at which adequate depth of focus is maintained;

b. first means to shift the raster on the tube of the television camera so that the apparent horizon is at the zero signal point of the vertical scan;

c. second means to selectively stretch said raster vertically about said zero point to simulate further altitude decrease; and d. third means to shift said raster so that said apparent horizon is returned to its original position with respect to said zero point.

8. The invention according to claim 7 wherein said second means comprises a multiplier having as a first input the vertical scan of said television camera and as a second input an altitude function.

9. The invention according to claim 8 wherein said altitude function is the ratio of said apparent altitude to the actual altitude of said probe.

10. The invention according to claim 8 wherein said first means comprises a first summing amplifier having as a first input the vertical scan of said television camera and as a second input a dc voltage representative of the amount by which said raster is to be shifted, the output of said amplifier being the first input to said multiplier.

11. The invention according to claim 10 wherein said second input is a function of the pitch of said probe.

12. The invention according to claim 10 wherein said third means comprises a second summing amplifier having as a first input the output of said multiplier and as a second input a quantity of the same value but of the opposite sign as said second input to said first summing amplifier.

* * * * *